(12) United States Patent
Colbow et al.

(10) Patent No.: US 6,884,530 B2
(45) Date of Patent: Apr. 26, 2005

(54) METHOD OF IMPROVING THE PERFORMANCE OF A DIRECT FEED FUEL CELL

(75) Inventors: Kevin Colbow, North Vancouver (CA); Monica Manmohan Kaila, Surrey (CA); Jiujun Zhang, Richmond (CA); Jens Müller, Ulm (DE); Gustav Boehm, Ueberlingen (DE)

(73) Assignee: SFC, Smart Fuel Cell AG, Brunnthal-Nord (DE)

( * ) Notice: Subject to any disclaimer, the term of this patent is extended or adjusted under 35 U.S.C. 154(b) by 239 days.

(21) Appl. No.: 09/871,039

(22) Filed: May 31, 2001

(65) Prior Publication Data

US 2002/0192513 A1 Dec. 19, 2002

(51) Int. Cl.$^7$ .............................. H01M 8/04
(52) U.S. Cl. .......................... 429/17; 429/13
(58) Field of Search .............. 429/12, 13, 22, 429/40, 3, 50, 61, 38, 44

(56) References Cited

U.S. PATENT DOCUMENTS

| | | | |
|---|---|---|---|
| 3,300,345 A | 1/1967 | Lyons, Jr. ............ | 136/86 |
| 3,987,352 A | 10/1976 | Hirota | |
| 4,294,892 A | 10/1981 | Alfenaar | |
| 6,096,448 A * | 8/2000 | Wilkinson et al. ........ | 429/13 |
| 2002/0083640 A1 * | 7/2002 | Finkelshtain et al. ...... | 44/314 |

FOREIGN PATENT DOCUMENTS

| | | |
|---|---|---|
| JP | 63026961 A | 2/1988 |
| JP | 11007974 A | 1/1999 |
| WO | WO-01508 A1 | 1/2001 |

OTHER PUBLICATIONS

Warszawski et al., "Alsthom Fuel Cells for Marine and Submarine Applications," Marine Technology Society Journal, vol. 5, No. 1, pp. 28–40 (1971).
Brummer et al., "Electrocatalysis of Methanol Fuel Cell Reactions—Present Status and Recommended Research," Proceedings of Workshop on Electrocatalysis Fuel Cell Reactions, pp. 116–122 (1978).
O'Grady et al., "Electrocatalysis of Fuel Cell Reactions—Present Status and Future Prospects," Proceedings of Workshop on Electrocatalysis Fuel Cell Reactions, pp. 5–22 (1978).
Farooquet et al., "The Anodic Oxidation of Methanol Via Continuous Electrode Reactivation," Electrochimica Acta, vol. 24, pp. 547–553 (1979).
Appleby et al., "Fuel Cell Hanbook,"Van Nostrand Reinhold, pp. 340–345, New York, US (1989).
Hammett et al., "Long–Term Poisoning of Methanol Anodes," Berichte der Bunsen–Gesellschaft fur Physikalische Chemie, vol. 94, pp. 1014–1020 (1990).

* cited by examiner

*Primary Examiner*—Bruce F. Bell
(74) *Attorney, Agent, or Firm*—Ip Strategies (57) ABSTRACT

The performance of a direct feed fuel cell such as, for example, a direct methanol fuel cell, with an anode having a CO-tolerant catalyst, such as a Pt—Ru catalyst, is improved by periodically reducing the output power of the cell to be less than the normal minimum output of the cell. This is effected, for example, by switching the cell at predetermined time intervals to an open circuit or reduced output power condition.

21 Claims, 10 Drawing Sheets

METHOD OF IMPROVING THE PERFORMANCE OF A DIRECT FEED FUEL CELL

FIELD OF THE INVENTION

The present invention relates to a method of improving the performance of a direct feed fuel cell, such as a direct methanol fuel cell and/or fuel cell stack, as well as an apparatus for carrying out the method.

BACKGROUND OF THE INVENTION

Electrochemical fuel cells convert reactants, namely fuel and oxidant fluid streams, to generate electric power and reaction products. Electrochemical fuel cells generally employ an electrolyte disposed between two electrodes, namely a cathode and an anode. An electrocatalyst typically induces the desired electrochemical reactions at the electrodes. In addition to electrocatalyst, the electrodes may also comprise a porous electrically conductive sheet material, or electrode substrate, upon which the electrocatalyst is deposited. The electrocatalyst may be a metal black, an alloy or a supported metal catalyst such as, for example, platinum on carbon.

A particularly interesting fuel cell is the solid polymer electrolyte fuel cell, which employs a membrane electrode assembly ("MEA"). The MEA comprises a solid polymer electrolyte or ion-exchange membrane disposed between the two electrode layers. Flow field plates for directing the reactants across one surface of each electrode substrate are typically disposed on each side of the MEA.

A measure of electrochemical fuel cell performance is the voltage output from the cell for a given current density. Higher performance is associated with a higher voltage output for a given current density or higher current density for a given voltage output.

A direct methanol fuel cell (DMFC) is a type of fuel cell in which methanol is directly oxidized at the anode. Although it may be operated on aqueous methanol vapour, a DMFC generally operates in a liquid feed mode on an aqueous methanol fuel solution. One problem which has been encountered with direct methanol fuel cells is performance degradation, that is, decrease in cell output voltage over time at a given current.

Hamnett et al. (Hamnett, A., Weeks, S. A., Kennedy, B. J, Troughton, G., Christensen, P. A., "Long-Term Poisoning of Methanol Anodes", Ber. Bunsenges. Phys. Chem. 94, 1014–1020 (1990)) conducted a study of long-term poisoning of methanol anodes. The work was carried out on half cells and not complete fuel cells. Platinum anodes and platinum-ruthenium anodes with a 2.5 M $H_2SO_4$ electrolyte and a reference electrode (mercury/mercurous sulphate) were employed.

With respect to pure platinum particle anodes, Hamnett et al. propose that poisoning on the electrode occurs by formation of a place-exchanged oxide which inhibits methanol adsorption. This oxide formation occurs at high anode potentials and can be removed at lower potentials, that is, open circuit. On the other hand, Hamnett et al. show that the amount of oxidised platinum when using a platinum-ruthenium anode is substantially greater that in the pure platinum anode. They further find that the amount of oxidised platinum decreases after extended polarisation and that it appears that the deactivation of platinum-ruthenium anodes is related to a gradual decrease in the amount of oxides on the platinum surface. They conclude that platinum-ruthenium anodes are poisoned by a different mechanism and expect that periodic open-circuiting of the platinum-ruthenium anode would not be so effective in enhancing the lifetime as for platinum anodes and they show test results demonstrating this.

In another study Zelenay et al. (Zelenay, Piotr; Thomas, S. C., Gottesfeld, Shimshon, "Direct Methanol Fuel Cells: Recent Progress In Fuel Efficiency, Cell Performance And Performance Stability", Electrochemical Society Proceedings, Volume 98–27, 300–315) referring to active DMFC platinum-ruthenium anodes that can be operated for prolonged periods of time without noticeable loss in performance, teach that neither opening of the cell circuit nor stopping the feed of methanol is a prerequisite for stability of anode performance using platinum-ruthenium catalysts.

SUMMARY OF THE INVENTION

A method improves the performance of a direct feed fuel cell having an anode comprising a CO-tolerant catalyst, a solid polymer electrolyte and a cathode. The fuel cell normally produces power in a range from a minimum to a maximum output. The method comprises the steps of providing a supply of fuel to the anode for the oxidation of the fuel to produce an oxidation product and electrons at the anode; providing a supply of oxidant to the cathode for reduction of the oxidant, thereby producing a reduction product; and reducing the output power of the fuel cell to be less than the normal minimum output at predetermined time intervals, preferably periodically.

Herein, a CO-tolerant catalyst is understood to be one having sites that adsorb carbon monoxide, but which can also adsorb an oxygen-containing species (for example, an OH group) near an adsorbed CO molecule at substantially lower potentials than a pure platinum catalyst. Examples are mixtures of platinum and certain elements, such as platinum-ruthenium, platinum-molybdenum, platinum-tin, platinum-tungsten, platinum-rhenium, platinum-osmium, platinum-iridium, as well as certain ternary mixtures.

The output power of the fuel cell may be reduced by reducing the current from the fuel cell at predetermined time intervals. The circuit may be switchable between a closed circuit condition in which the flow of electric current is permitted and an open circuit condition in which the flow of electric current is interrupted, reducing the output power of the fuel cell being effected by switching the current to the open circuit condition at predetermined time intervals.

The step of reducing the electric current in the circuit at predetermined time intervals may comprise the steps of operating the cell to provide electric current in the circuit for an operating period of about 0.5 to 4 hours; opening the circuit to terminate the flow of electric current for a rest period of about 1 second to 30 minutes; and ramping the current to increase from zero to a working value for a ramping period of up to 5 minutes.

The method may further comprise the step of interrupting the supply of fuel to the anode or the supply of oxidant to the cathode or both during the reduction of the output power of the fuel cell.

A direct feed solid polymer electrolyte fuel cell comprises an anode having a CO-tolerant catalyst and a cathode; a fuel supply line for directing fuel to the anode for the oxidation of the fuel to produce an oxidation product and electrons at the anode; an oxidant supply line for directing oxidant to the cathode for reduction of the oxidant to produce a reduction product; an external electric circuit connectable to the fuel cell for receiving power from the fuel cell; and a current controller for reducing the flow of electric current in the external circuit at predetermined time intervals.

The current controller may comprise a switch in the external circuit for switching the circuit to an open circuit condition at predetermined time intervals in which the flow of electric current in the circuit is interrupted.

The current controller may comprise a variable resistor in the external circuit for varying the flow of electric current in the external circuit at predetermined time intervals.

A fuel cell assembly comprises a plurality of fuel cell stacks connected together in series for providing electric power to a load. Each fuel cell comprises an anode having a CO-tolerant catalyst, a solid polymer electrolyte and a cathode, and a switching assembly for selectively disconnecting one or more of the fuel cell stacks from the load while the remainder of the fuel cell stacks remain connected to the load.

Further objects and advantages of the present method will become apparent from the description of preferred embodiment(s) below.

DETAILED DESCRIPTION OF PREFERRED EMBODIMENT(S)

Figure 1A:
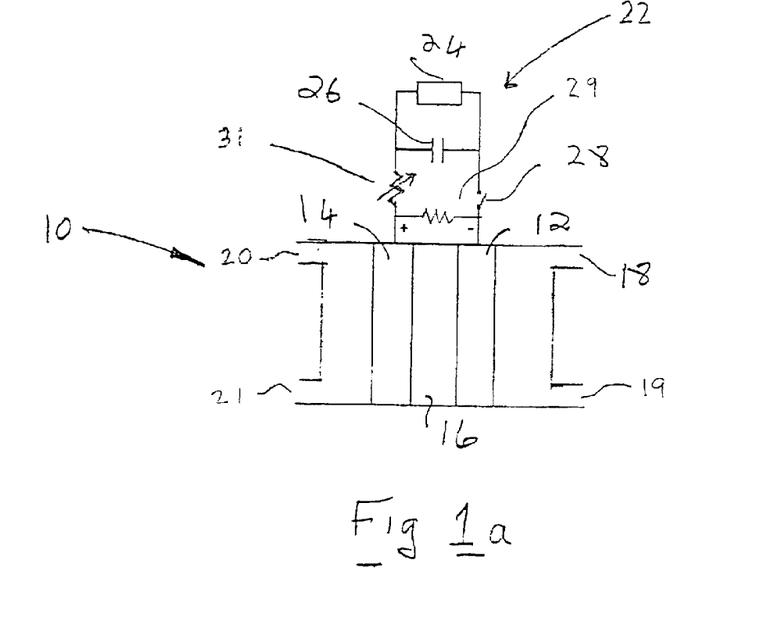
FIG. 1a is a diagrammatic illustration of a solid polymer electrolyte fuel cell connected to a load in an external circuit.

In FIG. 1a, reference numeral 10 generally indicates a direct methanol fuel cell comprising an anode 12 and a cathode 14 separated by a polymer electrolyte membrane 16.

The cell 10 has inlets 18 and 20 for directing fuel and oxidant to the anode 12 and cathode 14, respectively, as well as fuel and oxidant outlets 19 and 21.

Anode 12 and cathode 14 are connected by an external circuit 22 to an electrical load 24. A storage device or charge storage means, such as capacitor 26 is connected in parallel with the load 24. In place of capacitor 26 other suitable devices that act as buffers such, as a storage battery or the like, may be employed. The external circuit 22 is further provided with a switch 28 for opening and closing circuit 22 to the flow of electric power to load 24. When switch 28 is closed, cell 10 also charges the capacitor 26. When switch 28 is open, fuel cell 10 is disconnected from the load 24. During this time capacitor 26 provides power to load 24 for a limited period of time.

A resistor 29 is connected in parallel to fuel cell 10. The resistor 29, which may be variable, is optionally provided and draws a limited amount of power from fuel cell 10. For instance, resistor 29 may simply represent the power draw by a peripheral subsystem associated with fuel cell 10 such as a fan or pump.

During normal operation, load 24 itself may be varied and the power output from fuel cell 10 would be varied accordingly between a normal operating minimum and maximum output (for example, in an automobile, the power output would vary between that required at idle and that required under full acceleration). Typically, the ratio of the maximum power output to that of the minimum power output (or "turndown ratio") for such a fuel cell system is less than about 60. In FIG. 1a, the power consumed by resistor 29 is less than the normal operating minimum power output from fuel cell 10.

A variable resistor 31 is also provided in circuit 22. Variable resistor 31 may be operated when switch 28 is in the closed position in order to ramp the current up to a working value following an interruption period. Variable resistor 31 can also be used to prevent cell 10 from instantaneously shorting at the moment switch 28 is closed. Alternatively, variable resistor 31 may be employed instead of switch 28 to reduce the current flow and therefore the output power of the cell 10 to less than the normal minimum power output of cell 10. The switch 28 and resistor 31 can of course be combined in one unit, for example, a variable resistor which can shut off current flow completely or simply reduce the current flow as described above. The value of variable resistor 31 is such that its power consumption is negligible when compared to that of load 24.

In the present example the fuel is an aqueous mixture of methanol that is supplied to the anode 12 in either liquid or vapour form and the oxidant is oxygen gas or compressed air.

The anode 12 comprises a CO-tolerant catalyst, such as a platinum-ruthenium (Pt—Ru) alloy. In the present example the anode comprises a porous carbon layer coated with the catalyst.

During normal operation of the cell 10, methanol is oxidized at the anode. The oxidation products are $CO_2$, $H^+$ and electrons, although there are some intermediates or by-products which may be present, such as carbon monoxide (CO), formaldehyde (HCHO), formic acid (HCOOH), methyl formate ($HCOOCH_3$) and dimethoxymethane ($H_2C(OCH_3)_2$), depending upon the operating conditions.

At the cathode, water is produced. In addition water accumulates at the cathode due to electro-osmotic drag and diffusion from the anode. Depending on the membrane, some methanol may cross over to the cathode where it is oxidized. This results in methanol and its oxidation products being present at the cathode.

Figure 2:
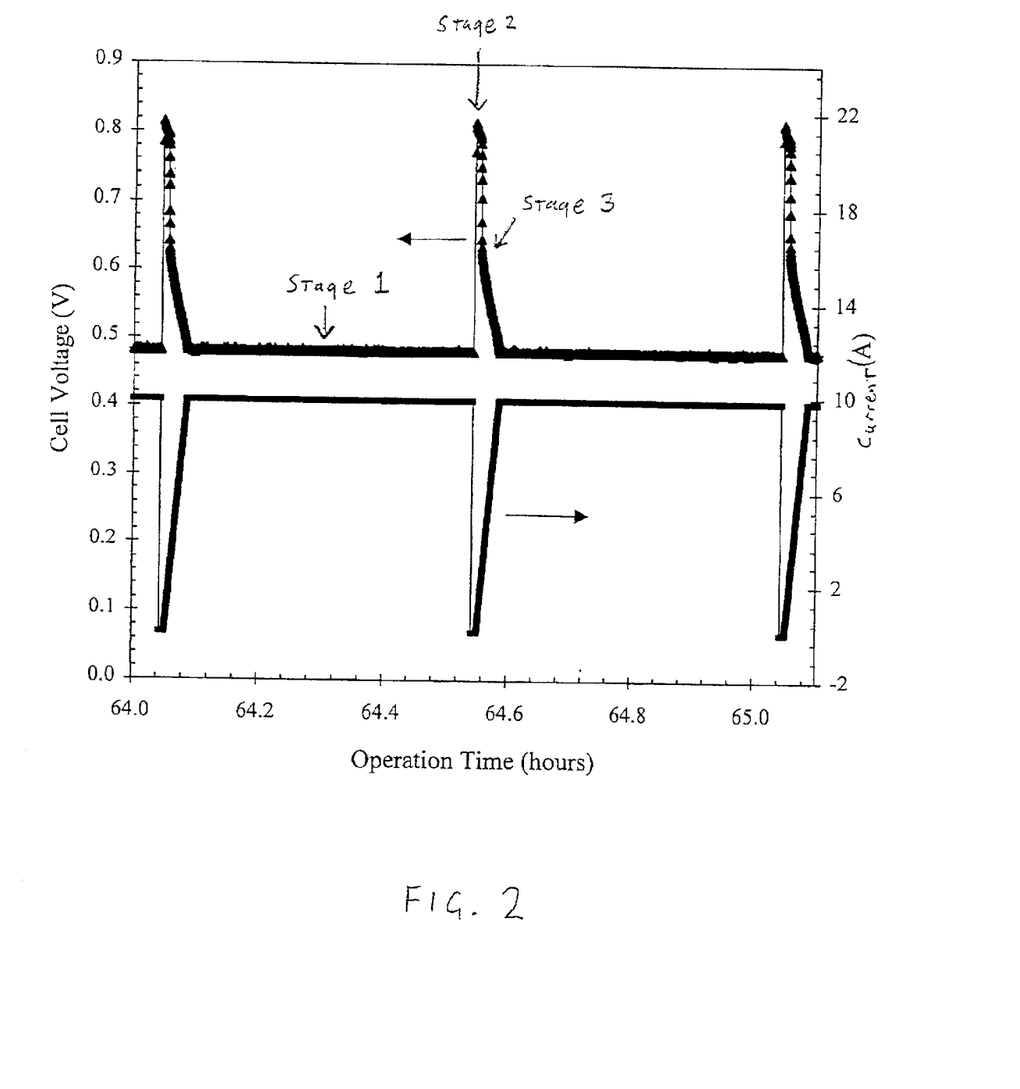
FIG. 2 is a plot of fuel cell voltage versus operation time, which illustrates periodically reducing the output power of the fuel cell.

The fuel cell 10 is operated at constant or varying power, as required, with interruptions of the power at predetermined time intervals. These interruptions may occur irregularly but periodic interruptions may be preferred. This procedure is effected in three stages or steps as illustrated in FIG. 2. During stage one, switch 28 is closed and cell 10 provides power to load 24, while also charging capacitor 26. The duration of this stage is preferably greater than 30 minutes.

During stage two, switch 28 is open so that external circuit 22 is open, that is, the cell is not providing load 24 with electrical power. The duration of this stage is preferably less than 30 seconds.

During stage three, switch 28 is closed so that electric current again flows in circuit 22. However the current does not have to be instantaneously returned to the value immediately prior to opening of switch 28, but can be ramped up to this value, either in stepwise fashion or linearly, for example, by means of variable resistor 31 in series with switch 28 or other means. The duration of stage three is about 2 minutes. In this way, the cell is subjected to periodic load interruptions, that is, periodic open circuit periods during which the flow of current in the circuit is interrupted.

It has been found that the above procedure has the effect of counteracting performance degradation of the cell 10. The procedure may be carried out manually or automatically, for example, by means of suitable software with the use of a computer. When the cell 10 is held at open circuit, or if the current flow in the circuit 22 is reduced below the normal operating minimum output, the normal reactions of methanol oxidation at the anode and oxygen reduction at the cathode no longer occur or the progress of these reactions is reduced. Without being bound by theory, the enhancement of cell performance is presumed to occur as a result of improvement of cathode mass transport properties, that is, improvement of transport of oxidant to the cathode catalyst that may arise from removal of reaction product (water) from the cathode. Therefore, this operating procedure works to improve long-term performance of the cell 10 by recovering the reversible performance degradation of the cell 10 when held at open or almost open circuit. Possible processes occurring which may lead to recovery include improved water removal at the cathode, improved carbon dioxide and intermediates removal at the anode, and improved removal of crossover methanol oxidation products at the cathode. In addition, the frequent repetition of the recovery technique counteracts the cell 10 from reaching highly degraded states which may become permanent over time and from operating at low cell potentials where other processes may occur to further degrade the cell 10.

While the operation of cell 10 has been described using capacitor 28 or other suitable storage device, it will be understood that cell 10 may be operated without the use of a capacitor in which case power supply to load 24 can be interrupted.

Figure 1B:
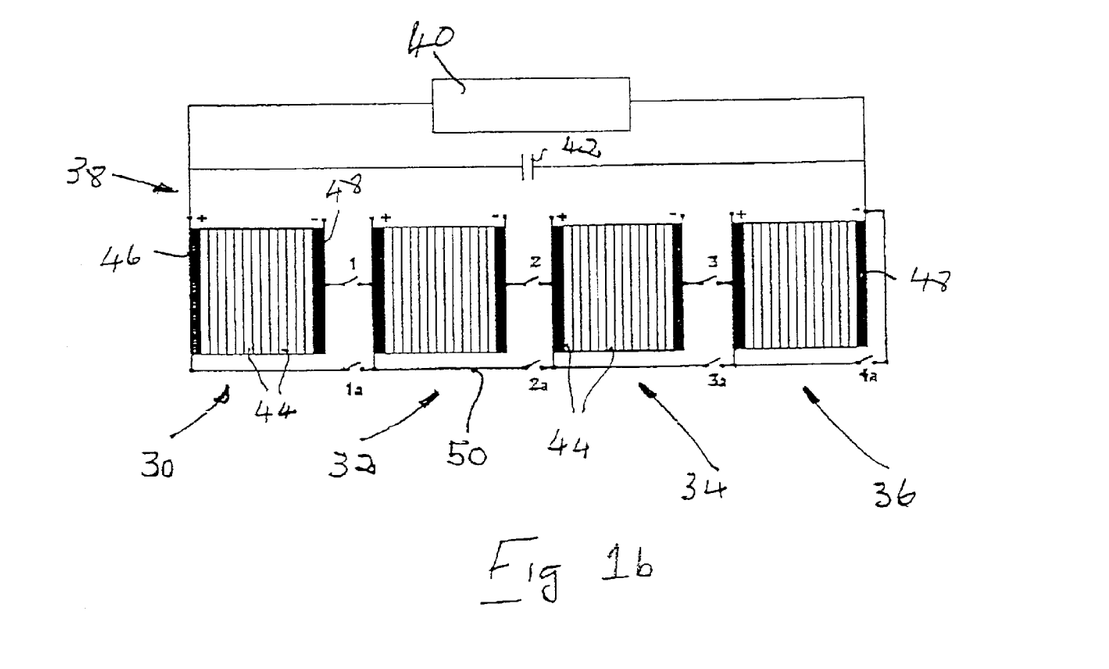
FIG. 1b is a diagrammatic illustration of a plurality of fuel cell stacks in series connected to a load in an external circuit.

Referring to FIG. 1b, fuel cell stacks 30, 32, 34 and 36 are shown connected to a load 40. A capacitor 42 is connected in parallel with load 40. Each of the fuel cell stacks 30, 32, 34, 36 comprises a plurality of individual fuel cells 44 connected together in series and housed between conductive current collector plates 46 (positive) and 48 (negative).

The plates 46 are connected together by means of conductor 50, which is provided with switches 1a, 2a, 3a and 4a, as shown. In addition plate 48 of stack 30 is connected to plate 46 of stack 32, through switch 1. Likewise plate 48 of stack 32 is connected to plate 46 of stack 34 through switch 2 and plate 48 of stack 34 is connected to plate 46 of stack 36 through switch 3.

This configuration allows one or more of the stacks 30, 32, 34 and 36 to be held at open circuit individually while the other stacks still provide electricity to the load 40. For example, if stack 30 is to be held at open circuit then switches 1a, 2, and 3 will be closed while switches 1, 2a, 3a and 4a will be open. If stack 34 is to be held at open circuit then switches 1, 2 and 3a will be closed, while switches 1a, 2a, 3 and 4a will be open. In this manner the current by-passes the chosen stack and the stack remains at open circuit until the switches are changed to allow current to flow through the stack.

With this type of configuration, each of the stacks can be operational and individual stacks can be held at open circuit when desired, while the remainder of the stacks still provide power.

EXAMPLES

Figure 3:
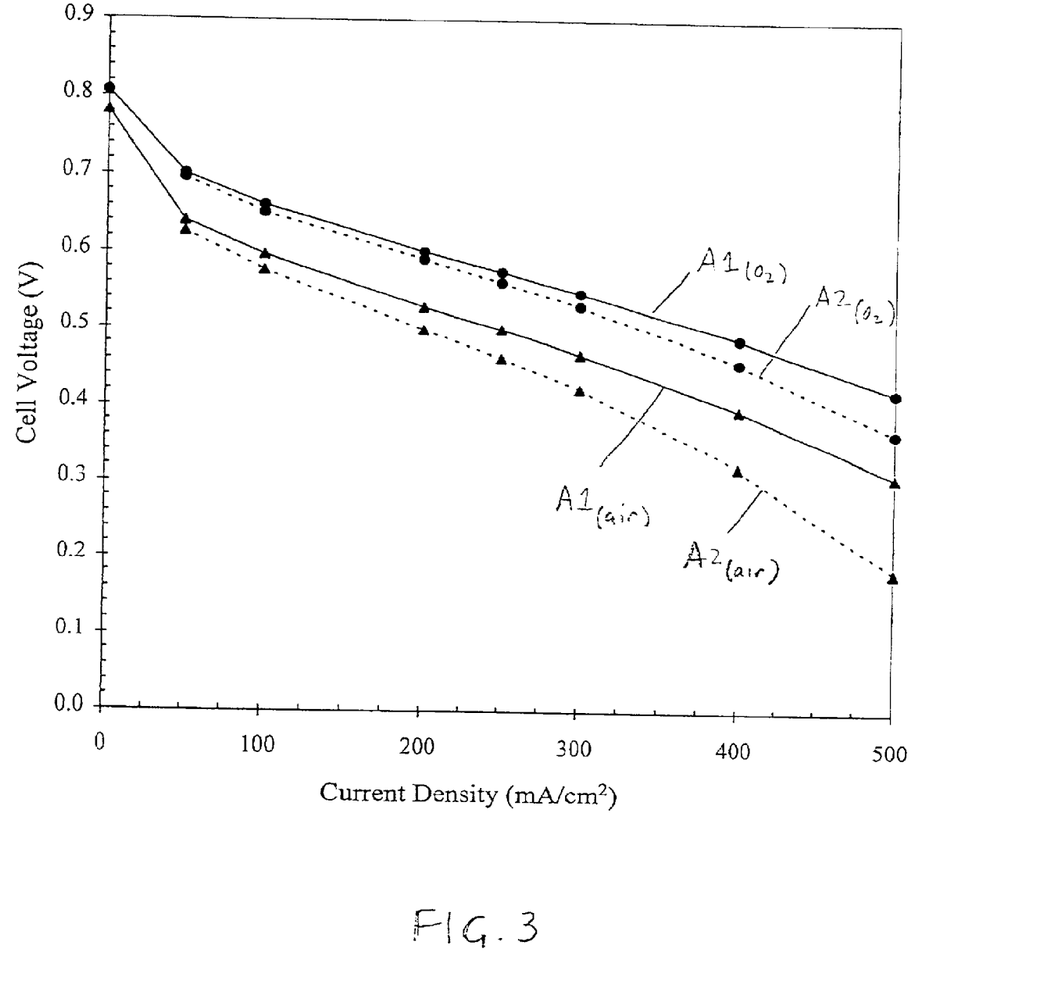
FIG. 3 shows polarization plots which illustrate the cathode mass transport degradation of a DMFC (single cell) operated continuously for a period of time.
Figure 4:
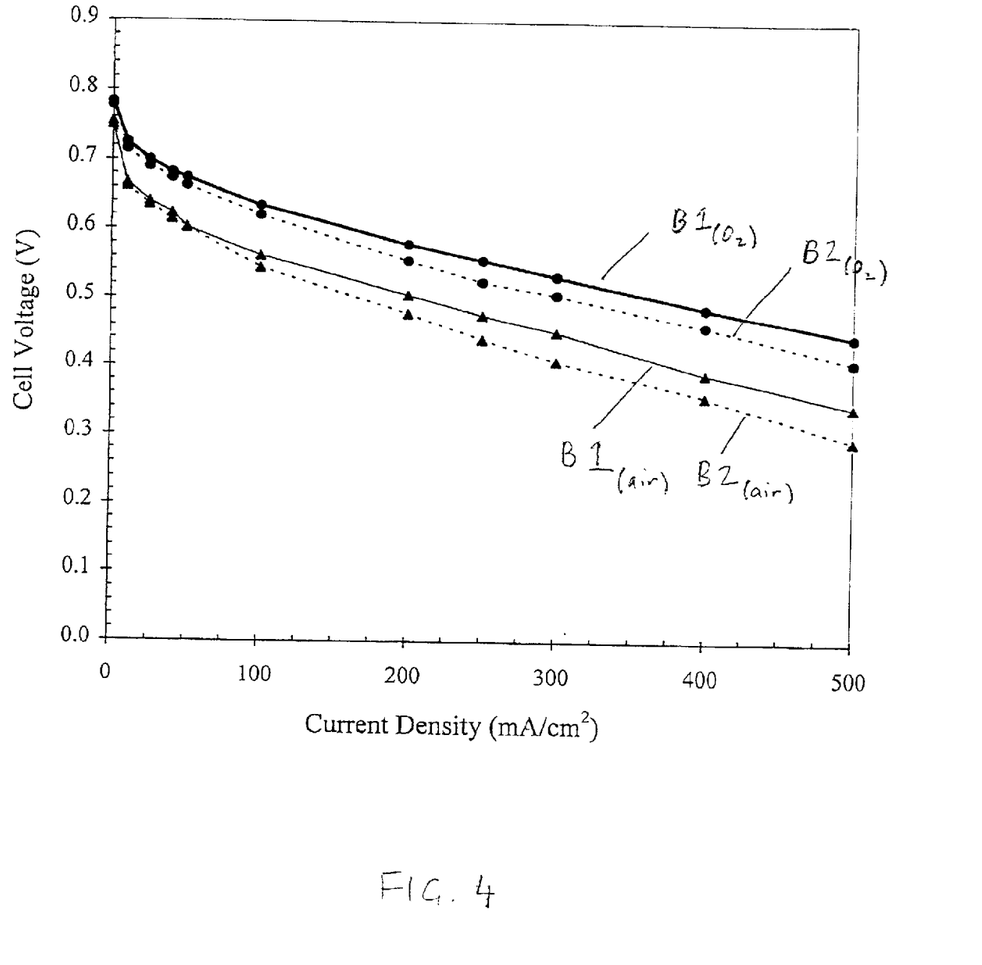
FIG. 4 shows polarization plots for a cell similar to FIG. 3 but with the cell being operated with periodic load interruptions.

Polarization plots (voltage versus current densities) are shown in FIG. 3 and illustrate the cathode mass transport degradation of a DMFC (single cell A) operated continuously at 200 mA/cm$^2$ for 16 hours. Plots A1($O_2$) and A1(air) show the initial polarization results for the DMFC when operated on pure oxygen or air oxidant respectively. The effect that diluting the oxidant stream with about 80% inert gas (nitrogen) has on initial performance is indicated by the difference between plots A1($O_2$) and A1(air). Plots A2($O_2$) and A2(air) show the polarization results for the same cell on pure oxygen and air respectively after only 16 hours of continuous operation. The difference between the air and pure oxygen polarization plots after continuous operation has become more substantial, particularly at higher current densities (that is, the difference A2(air)–A2($O_2$) is greater than the difference A1(air)–A1($O_2$), particularly at higher current densities). In comparison, FIG. 4 shows polarization results for a similar DMFC (cell B) that had been operated for 1978 hours with periodic load interruptions wherein the cell was open circuited every 30 minutes for a period of 30 seconds and then the load was ramped up to normal over a period of 2 minutes (a "30 minute/30 second recovery cycle"). Plots B1($O_2$) and B1(air) show the initial performance on pure oxygen and air respectively and plots B2($O_2$) and B2(air) show the performance after 1978 hours of operation on pure oxygen and air respectively. The difference between the air and pure oxygen polarization plots has not changed substantially after prolonged operation (that is, the difference B2(air)–B2($O_2$) is about the same as the difference B1(air)–B1($O_2$) even after prolonged operation). The load interruption method allowed the cell to operate over 120 times longer with less performance degradation.

FIGS. 5a–d show AC impedance spectra of the electrodes in certain tested DMFCs. In obtaining these spectra, first a spectrum is taken of the complete DMFC operating under normal conditions (that is, oxidant and fuel are supplied to the cathode and anode respectively) which gives the spectrum of the combined impedances of cathode, electrolyte, and anode. Then, a spectrum is obtained under similar conditions but with nitrogen gas supplied to the cathode, thus essentially making the cathode a reference electrode. The spectrum obtained in this case is then that of the combined impedances of electrolyte and anode. The spectrum of the cathode is then derived by taking the difference between the two spectra.

Figure 5A:
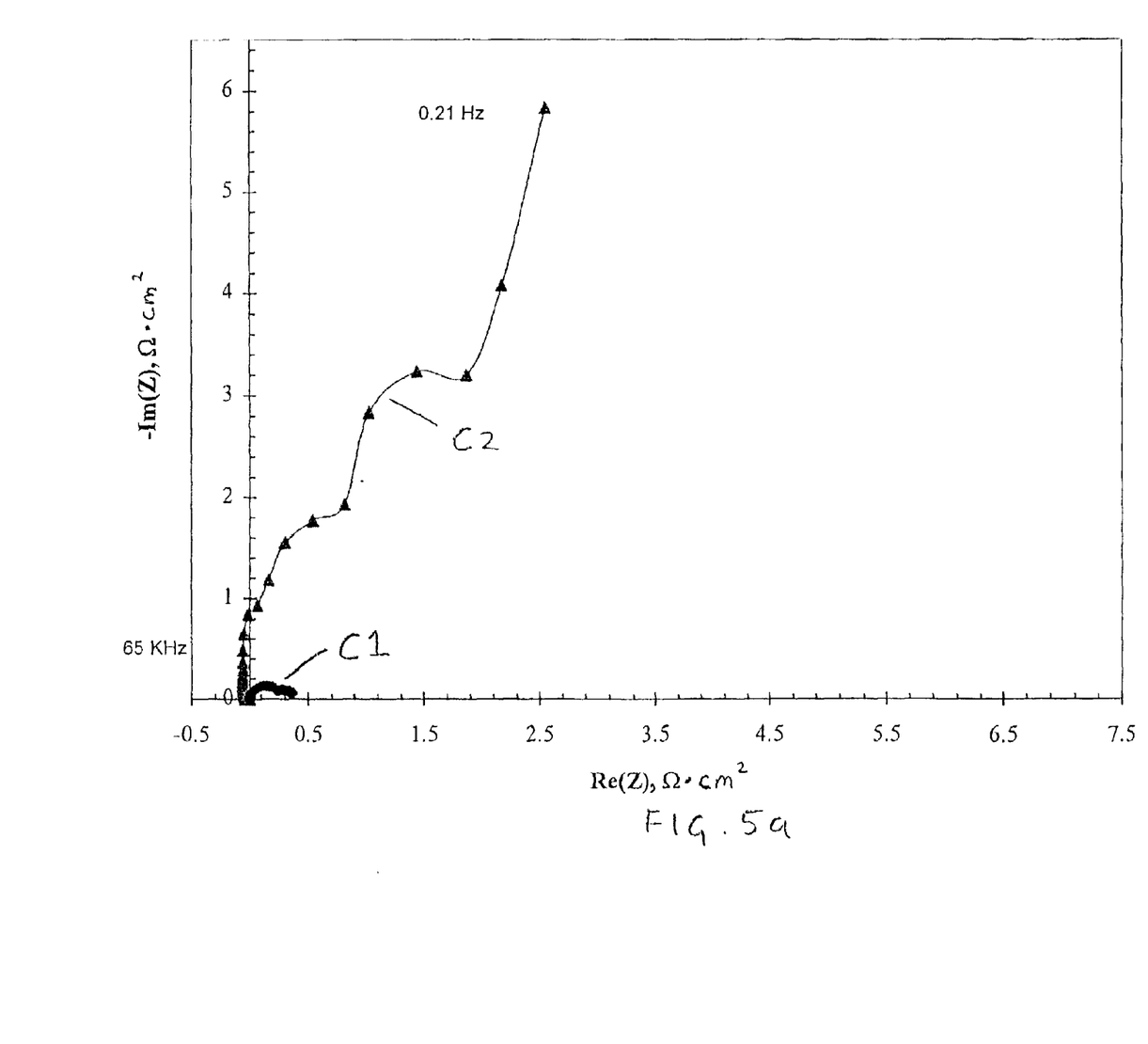
FIGS. 5a and 5b show AC impedance spectra of DMFCs that illustrate the effect of periodic load interruptions on cathode mass transport degradation.
Figure 5B:
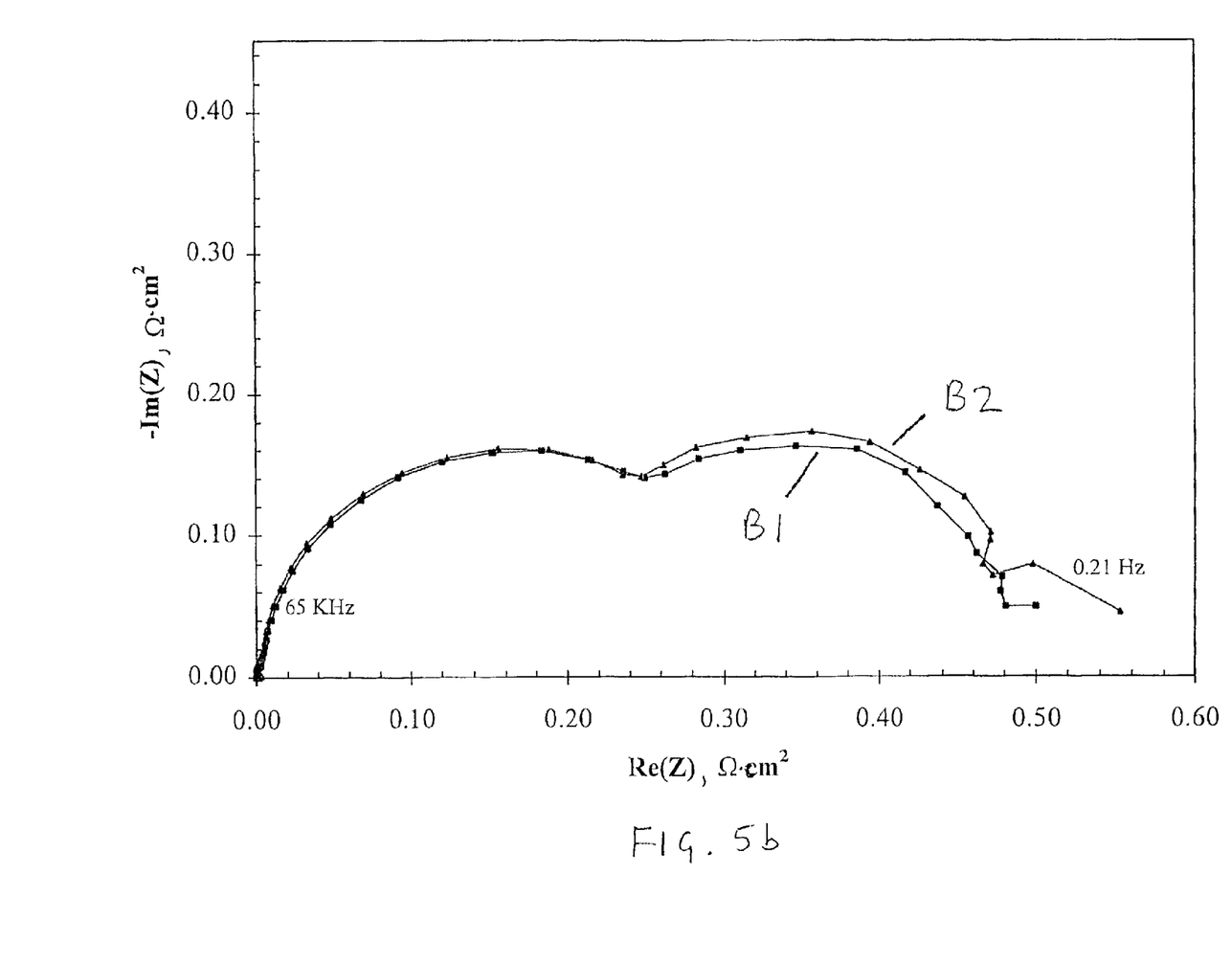

FIGS. 5a and 5b are AC impedance spectra of DMFCs that are also illustrative of the effect that the inventive method has on cathode mass transport degradation. The spectra were taken at 250 mA/cm$^2$ over a frequency range from 65 KHz to 0.21 Hz. FIG. 5a shows the AC impedance spectra for the cathode electrode of a DMFC (cell C) similar to those of FIGS. 3 and 4. The DMFC of FIG. 5a however had been operated for 1090 hours and an attempt was made to improve performance via a different anode starvation recovery procedure every 24 hours (involving starving the anode of fuel which causes a temporary change in anode potential). Plot C1 shows the initial cathode impedance spectrum and plot C2 shows the spectrum after 1090 hours of operation. The cathode impedance has increased substantially. On the other hand, FIG. 5b shows the cathode impedance spectra for the aforementioned DMFC (cell B) of FIG. 4. Plot B1 shows the initial cathode impedance spectrum and plot B2 shows the spectrum after 1978 hours of operation. There is no significant increase in cathode impedance.

Figure 5C:
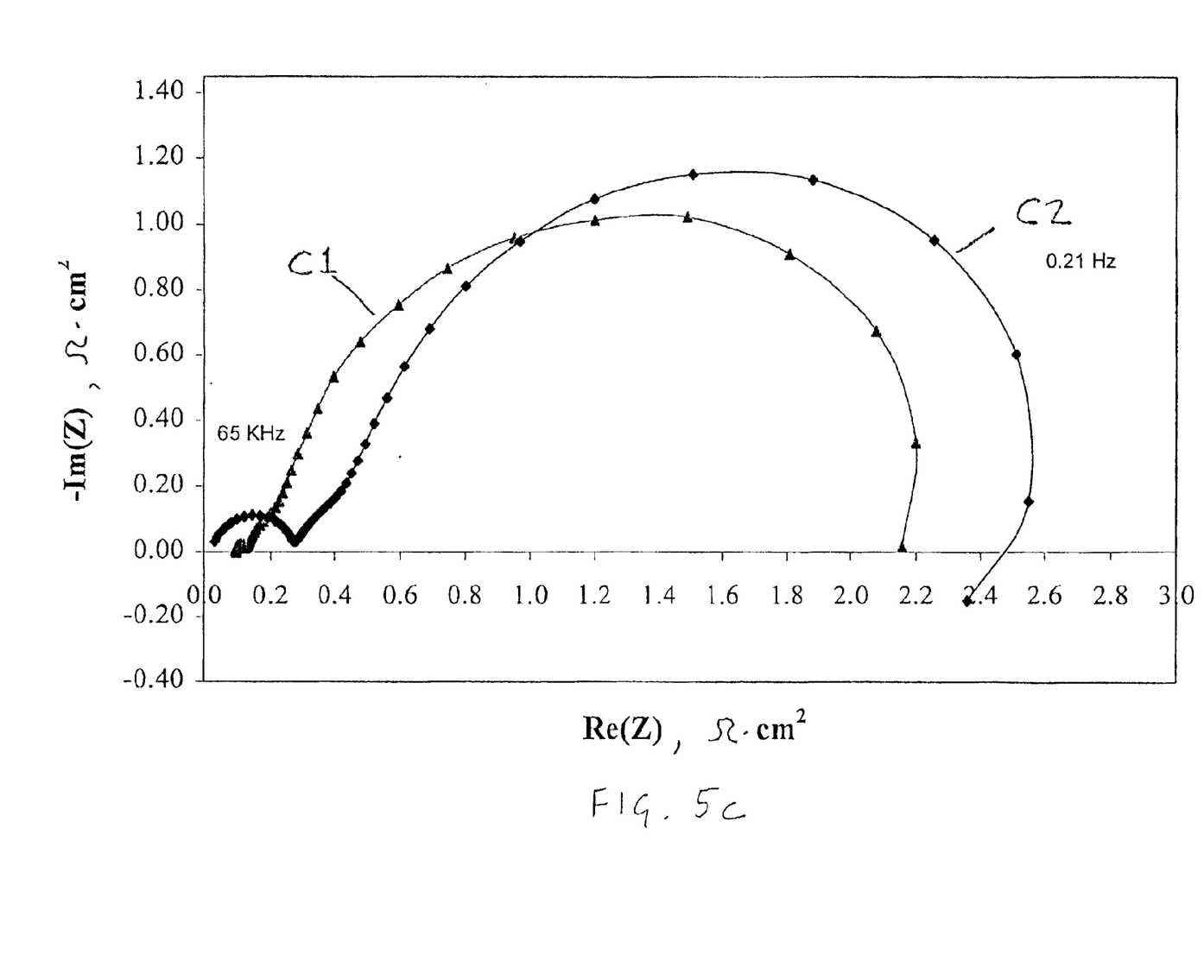
FIGS. 5c and 5d show the AC impedance of the anodes for the same two DMFCs of FIGS. 5a and 5b.
Figure 5D:
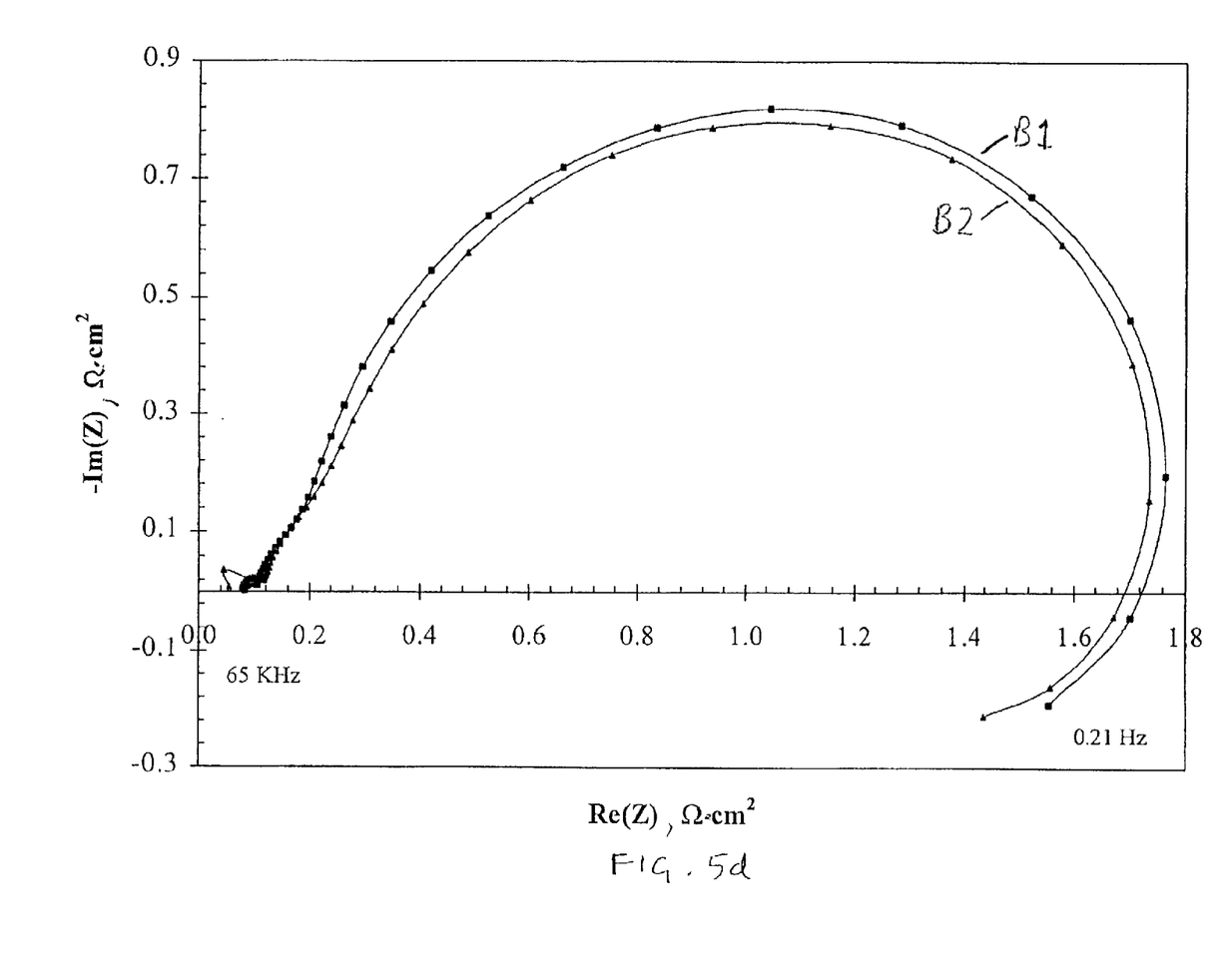

FIGS. 5c and 5d are also presented to show the AC impedance of the anodes plus electrolytes for the same two DMFCs. In this case, the spectra were taken at 50 mA/cm$^2$. FIG. 5c shows the AC impedance of the anode plus electrolyte of cell C initially (plot C1) and after 1090 hours of operation (plot C2). FIG. 5d shows the AC impedance spectrum of the anode plus electrolyte of cell B initially (plot B1) and after 1978 hours of operation (plot B2). There is no significant difference in the anode plus electrolyte impedances before and after prolonged operation in either cell. The predominant loss in performance thus appears to originate from effects at the cathode.

Table 1 shows the degradation rate of cell voltage for the DMFC of FIG. 4 when subjected to various combinations of load application time, open circuit time, and ramp time (that is, stage 1, stage 2, and stage 3 times). Each combination gave a lower degradation rate than that for continuous operation under load (1500 $\mu$V/hr as determined from operating continuously for 16 hours).

TABLE 1

| Load On Steady (min) Stage 1 | Open Circuit(s) Stage 2 | Load On Ramp(s) Stage 3 | Degradation Rate ($\mu$V/hr) |
|---|---|---|---|
| 27.5 | 30 | 120 | 26 |
| 27.5 | 3 | 120 | 6 |
| 237.5 | 30 | 120 | 50 |
| 29 | 30 | 30 | 0–70 |
| 27.5 | 30* | 120 | 200–400 |
| 27.5 | 1 | 120 | 120 |
| 29.3 | 30 | 10 | 2 |
| 29.3 | 1 | 10 | 220 |
| 29 | 3 | 30 | 80 |
| 1440 | 30 | 120 | 170** |

*Cell was not open circuit but was operated at a reduced current density of 50 mA/cm$^2$.
**420 $\mu$/hr over the first 1440 minute load on period.

Figure 6:
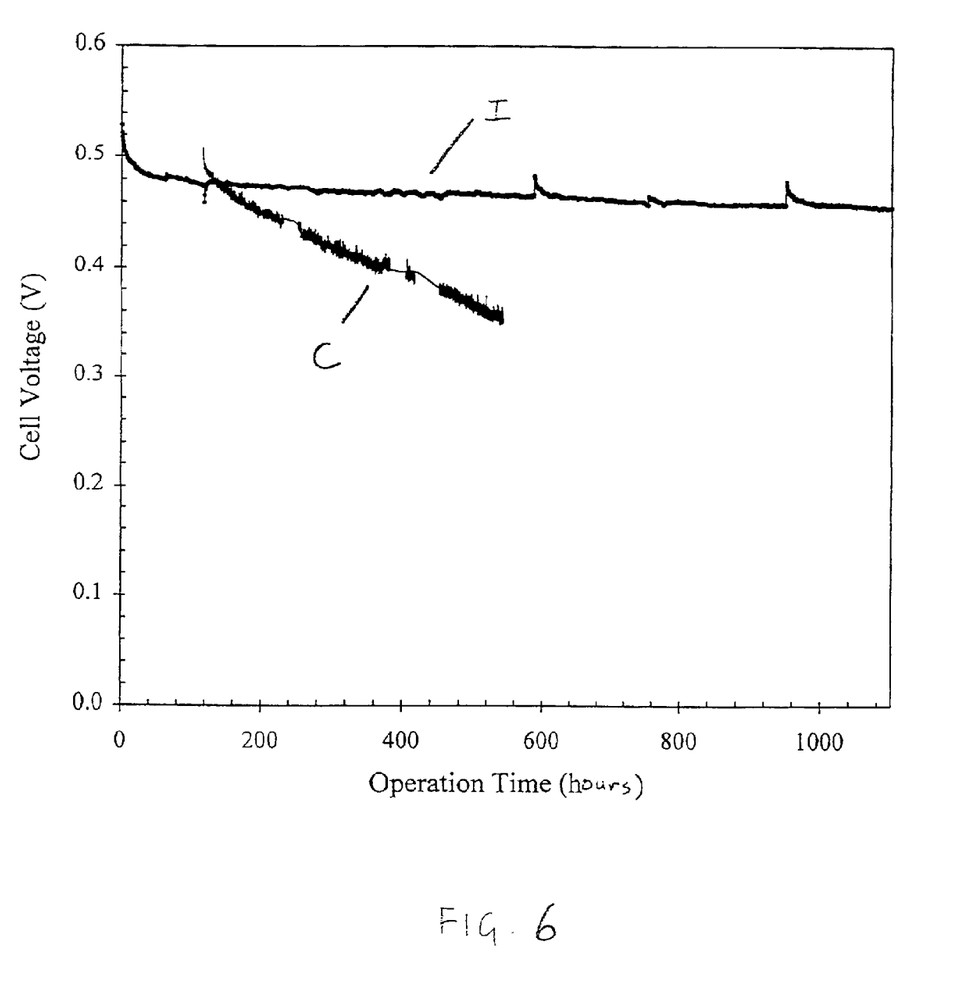
FIG. 6 is a plot showing a direct comparison of cell voltage versus operation time for a DMFC operated using a 30 minute/30 second recovery cycle technique and a similar DMFC operated continuously under load.

FIG. 6 shows a direct comparison of cell voltage versus operation time for a DMFC operated using the "30 minute/30 second recovery cycle" technique and a similar DMFC operated continuously under load. Plot C shows the voltage of the conventional DMFC which degraded at a rate of about 300 $\mu$V/hr. Plot I shows the voltage of the DMFC operated using the "30 minute/30 second recovery cycle" technique. After 1000 hours of testing, this DMFC showed a degradation rate of only about 26 $\mu$V/hr.

In addition to interrupting the current, the supply of fuel or oxidant or both fuel and oxidant to the anode and cathode, respectively may be interrupted. This system interruption should be timed to occur simultaneously with the current interruption stage two, described above.

Figure 7:
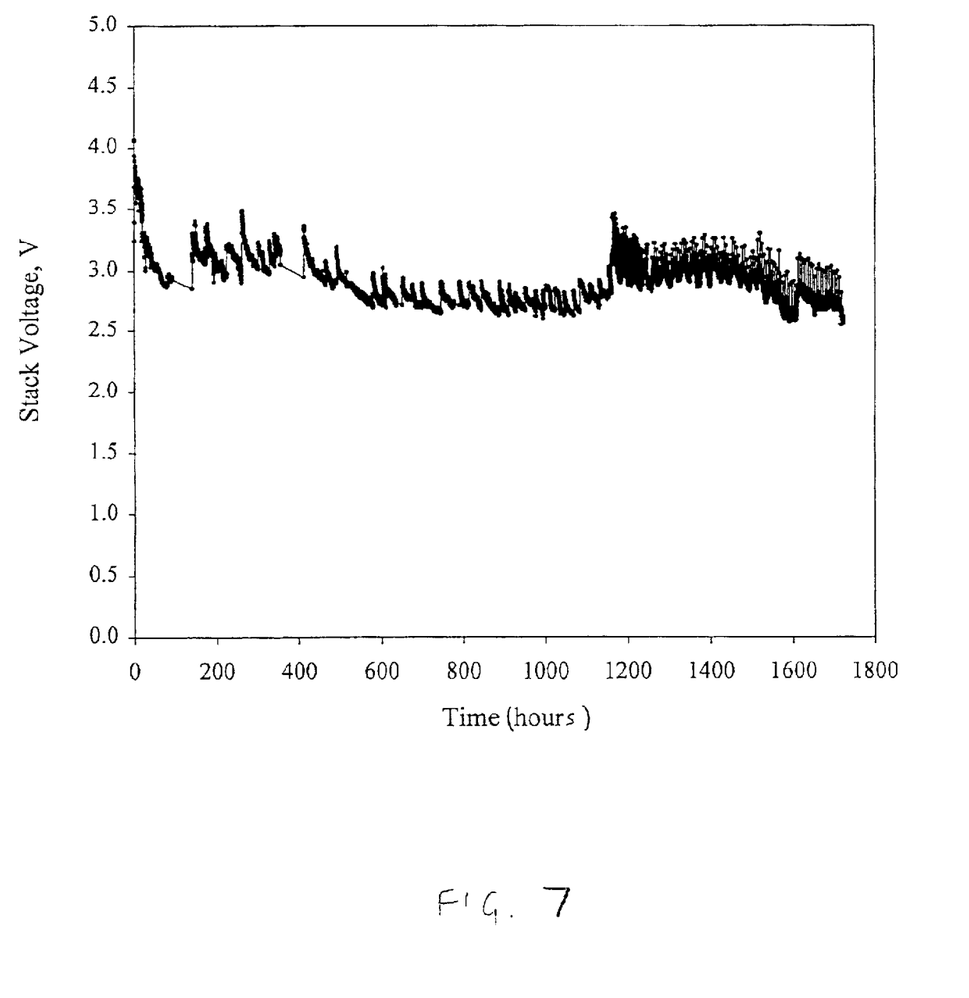
FIG. 7 is a plot of stack voltage versus operating time of a ten cell direct methanol fuel cell stack operated using two different recovery procedures.

A direct methanol compact power stack comprising 10 fuel cells was then tested using two different recovery procedures. Over about the first 1200 hours of operation, the stack was switched to an open circuit condition every 24 hours for about 30 minutes. (On occasion, the stack stayed under load for more than 24 hours between open circuits). In addition, the flow of fuel and oxidant were also interrupted during these open circuit periods. Thereafter, periodic switching to an open circuit condition with reactant interruption continued using the "30 minute/30 second recovery cycle" procedure. FIG. 7 shows the stack voltage of this stack versus operating time. Overall, a markedly improved 15 $\mu$V/hr per cell degradation rate was observed for over 1700 hours of operation at 200 mA/cm$^2$.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A method of improving the performance of a direct feed fuel cell having an anode comprising a CO-tolerant catalyst, a solid polymer electrolyte, and a cathode, the fuel cell providing output power to a load in an operating range from a minimum operational output level to a maximum operational output level, comprising:

providing a supply of fuel to the anode for the oxidation of the fuel to produce an oxidation product and electrons at the anode;

providing a supply of oxidant to the cathode for reduction of the oxidant, thereby producing a reduction product; and reducing the output power of the fuel cell to the load at predetermined time intervals to be less than the minimum operational output level.

2. The method of claim 1, wherein the output power of the fuel cell is periodically reduced at predetermined time intervals.

3. The method of claim 2, wherein each said predetermined time interval has a duration in a range from about 0.5 hours to about 4 hours.

4. The method of claim 3, wherein the predetermined time intervals are about 30 minutes.

5. The method of claim 1, wherein a ratio of the normal maximum output and the normal minimum output is less than or equal to 60:1.

6. The method of claim 1, wherein the CO-tolerant catalyst comprises platinum and at least one element capable of adsorbing an oxygen-containing species at substantially lower potentials than a pure platinum catalyst.

7. The method of claim 6, wherein the at least one element is selected from the group consisting of ruthenium, molybdenum, tin, tungsten, rhenium, osmium and iridium.

8. The method of claim 1, wherein reducing the output power of the fuel cell includes reducing the output current from the fuel cell at predetermined time intervals.

9. The method of claim 1, further comprising providing the output power to an external circuit that is switchable between a closed circuit condition in which the flow of electric current is permitted and an open circuit condition in which the flow of electric current is interrupted, wherein reducing the output power of the fuel cell includes switching the circuit to the open circuit condition at predetermined time intervals.

10. The method of claim 9, wherein the circuit is switched to the closed position for a period of greater than about 30 minutes.

11. The method of claim 9, wherein the circuit is switched to the open position for a period of less than about 30 seconds.

12. The method of claim 9, wherein reducing the output power of the fuel cell at predetermined time intervals comprises:

operating the cell to provide electric current in the circuit for an operating period of about 0.5 to 4 hours;

opening the circuit terminate the flow of electric current for a rest period of 1 second to 30 minutes; and ramping the current to increase from zero to a working value for a ramping period of up to 5 minutes.

13. The method of claim 12, wherein the operating period has a duration of greater than about 30 minutes.

14. The method of claim 12, wherein the rest period has a duration of less than about 30 seconds.

15. The method or claim 12, wherein the ramping period has a duration of less than about 2 minutes.

16. The method of claim 12, wherein the ramping period has a duration of greater than about 10 seconds.

17. The method of claim 1, further comprising interrupting the supply of fuel to the anode it predetermined time intervals when the output power of the fuel cell is reduced.

18. The method of claim 1, further comprising interrupting the supply of oxidant to the cathode at predetermined time intervals when the output power of the fuel cell is reduced.

19. The method of claim 1, wherein the cathode comprises platinum as catalyst.

20. The method of claim 1, wherein the fuel comprises methanol.

21. The method of claim 20, wherein the fuel comprises a liquid aqueous methanol solution.

* * * * *